(12) United States Patent
Motoyanagi et al.

(10) Patent No.: US 10,994,454 B2
(45) Date of Patent: May 4, 2021

(54) THERMALLY EXPANDABLE SHEET, PRODUCTION METHOD FOR THERMALLY EXPANDABLE SHEET, AND 2.5D IMAGE FORMING METHOD

(71) Applicant: CASIO COMPUTER CO., LTD., Tokyo (JP)

(72) Inventors: Yoshimune Motoyanagi, Hamura (JP); Yuji Horiuchi, Higashiyamato (JP); Satoshi Mitsui, Tokyo (JP); Hideki Takahashi, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 437 days.

(21) Appl. No.: 16/018,342

(22) Filed: Jun. 26, 2018

(65) Prior Publication Data
US 2018/0370092 A1 Dec. 27, 2018

(30) Foreign Application Priority Data

Jun. 26, 2017 (JP) .............................. JP2017-124656
Jun. 18, 2018 (JP) .............................. JP2018-115542

(51) Int. Cl.
| | | |
|---|---|---|
| B29C 44/34 | (2006.01) | |
| B29C 44/60 | (2006.01) | |
| B29C 35/08 | (2006.01) | |
| B29C 59/18 | (2006.01) | |
| B29C 35/02 | (2006.01) | |
| B29C 44/24 | (2006.01) | |
| B29K 75/00 | (2006.01) | |
| B29K 105/04 | (2006.01) | |

(52) U.S. Cl.
CPC ...... B29C 44/3415 (2013.01); B29C 35/0272 (2013.01); B29C 35/0805 (2013.01); B29C 44/24 (2013.01); B29C 44/60 (2013.01); B29C 59/18 (2013.01); *B29C 2035/0822* (2013.01); *B29K 2075/00* (2013.01); *B29K 2105/048* (2013.01)

(58) Field of Classification Search
CPC . B29C 44/3415; B29C 59/18; B29C 35/0272; B29C 44/24; B29C 35/0805; B29C 44/60; B29C 2035/0822; B29K 2105/048; B29K 2075/00
See application file for complete search history.

(56) References Cited

U.S. PATENT DOCUMENTS

2018/0169932 A1* 6/2018 Saito .................. B29C 35/0805
2019/0047223 A1* 2/2019 Kurosawa ............. B33Y 70/00

FOREIGN PATENT DOCUMENTS

| JP | S64-028660 A | 1/1989 |
| JP | H02-193154 A | 7/1990 |
| JP | H09-175099 A | 7/1997 |
| JP | 2001-150812 A | 6/2001 |

* cited by examiner

*Primary Examiner* — Robert J Grun
(74) *Attorney, Agent, or Firm* — Scully Scott Murphy & Presser

(57) ABSTRACT

A thermally expandable sheet includes:
a thermally expansive layer formed on a one surface of a base;
a first ink receiving layer that is provided on the thermally expansive layer for receiving ink;
a film provided on the first ink receiving layer; and
a second ink receiving layer that is provided on the film for receiving ink;
wherein the first ink receiving layer is formed of a material that provides a texture a different from a texture of the second ink receiving layer.

6 Claims, 13 Drawing Sheets

THERMALLY EXPANDABLE SHEET, PRODUCTION METHOD FOR THERMALLY EXPANDABLE SHEET, AND 2.5D IMAGE FORMING METHOD

CROSS-REFERENCE TO RELATED APPLICATION

This application claims the benefit of Japanese Patent Application No. 2017-124656, filed on Jun. 26, 2017, and Japanese Patent Application No. 2018-115542 filed on Jun. 18, 2018, the entire disclosure of which is incorporated by reference herein.

FIELD

This application relates generally to a thermally expandable sheet foaming and expanding according to the amount of heat absorbed, a method for producing the thermally expandable sheet, and a 2.5D image forming method.

BACKGROUND

In the related art, thermally expandable sheets in which a thermally expansive layer containing a thermally expandable material foaming and expanding according to the amount of heat absorbed is formed on one side of a base sheet are known. The thermally expansive layer can be distended in part or in whole by forming a photothermal conversion layer converting light to heat on the thermally expandable sheet and irradiating the photothermal conversion layer with light. Moreover, methods for forming a shaped object having a three dimensional uneven surface on the thermally expandable sheet by changing the shape of the photothermal conversion layer are also known (see, for example, Unexamined Japanese Patent Application Kokai Publication Nos. S64-28660 and 2001-150812).

The texture (for example, glossy, non-glossy) of the shaped object formed on the surface of thermally expandable sheet varies depending on the material from which the layer provided on the sheet surface is formed. Therefore, when the texture of the shaped object is to be varied throughout the whole sheet, sheets in which the layers provided on the surface contain different materials must be prepared and individually printed, or the whole sheet must be subjected to secondary processing (for example, a glossy treatment) to cause the texture of the surface to vary. Moreover, a problem is that, when the texture of the shaped object is to be varied in a portion of the sheet, that portion must be subjected to secondary processing.

Therefore, there is a demand for a thermally expandable sheet, a production method for the thermally expandable sheet, and a 2.5D image forming method whereby a shaped object having varying textures can be formed by one sheet.

The present disclosure is made with the view of the above situation, and an objective of the present disclosure is to provide a thermally expandable sheet in which a shaped object having varying textures can be formed, a production method for the thermally expandable sheet, and a 2.5D image forming method.

SUMMARY

A thermally expandable sheet includes:
a thermally expansive layer formed on one surface of a base;
a first ink receiving layer that is provided on the thermally expansive layer for receiving ink;
a film provided on the first ink receiving layer; and
a second ink receiving layer that is provided on the film for receiving ink
the first ink receiving layer being formed of a material that provides a texture different from a texture of the second ink receiving layer.

A thermally expandable sheet includes:
forming a thermally expansive layer on one surface of a base; and
forming a first ink receiving layer on the thermally expansive layer for receiving ink;
providing a film on the first ink receiving layer; and
forming a second ink receiving layer on the film for receiving ink, wherein
the first ink receiving layer is formed using a material that provides a texture different from a texture of the second ink receiving layer.

A 2.5D image forming method includes:
using a thermally expandable sheet comprising a thermally expansive layer formed on one surface of a base, a first ink receiving layer that is formed on the thermally expansive layer for receiving ink, a film provided on the first ink receiving layer, and a second ink receiving layer that is formed on the film for receiving ink, the first ink receiving layer being formed of a material that provides a texture different from a texture of the second ink receiving layer;
forming of a second image on the second ink receiving layer;
removing at least a portion of the film and exposing the first ink receiving layer;
forming of a first image on the first ink receiving layer that is exposed;
forming of a first electromagnetic wave heat conversion layer for converting electromagnetic waves to heat on another surface of the base; and
irradiating of the first electromagnetic wave heat conversion layer with electromagnetic waves thereby causing at least a portion of the thermally expansive layer to distend, wherein
the film is removed such that a region where the second image is printed or to be printed remains.

According to the present disclosure, a thermally expandable sheet in which a shaped object having varying textures can be formed, a production method for the thermally expandable sheet, and a 2.5D image forming method can be provided.

BRIEF DESCRIPTION OF THE DRAWINGS

A more complete understanding of this application can be obtained when the following detailed description is considered in conjunction with the following drawings, in which.

DETAILED DESCRIPTION

The thermally expandable sheet, the production method for the thermally expandable sheet, and the 2.5D image forming method according to embodiments of the present disclosure will be described in detail below using the drawings.

In this embodiment, a shaped object is expressed on the front surface of a thermally expandable sheet 10 by the bulging of a thermally expansive layer 12. In this application, the term "shaped object" includes a wide range of shapes such as simple shapes, geometrical shapes, characters, and decorations. The term "decorations" refers to objects that appeal to the aesthetic sense through visual and/or tactile sensation. The term "shaped (or molded)" does not simply refer to the forming of a shaped object, but should be construed to also include concepts such as decorating and ornamenting. The term "decorative shaped object" refers to a shaped object formed as a result of decorating or ornamenting.

The shaped object according to the present embodiments uses as a reference a particular two-dimensional plane (for example, the XY plane) within three-dimensional space, and includes unevenness in a direction perpendicular (for example, the Z-axis direction) to that plane. Such a shaped object is an example of a three-dimensional (3D) image, but to distinguish this shaped object from a three-dimensional image produced using a so-called 3D printing technique, the shaped object is called a 2.5-dimensional (2.5D) image or a pseudo-three-dimensional (pseudo-3D) image. Furthermore, the technique for producing the shaped object is an example of a three-dimensional image printing technique, but to distinguish this technique from a so-called 3D printer, the technique is called a 2.5-dimensional (2.5D) printing technique or a pseudo-three-dimensional (pseudo-3D) printing technique.

Embodiment 1

Figure 1:
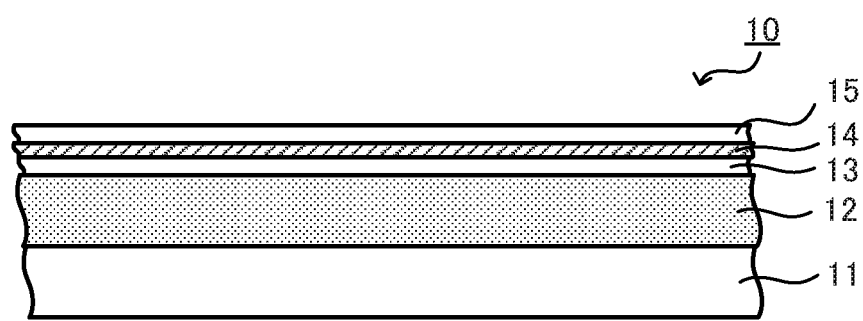
FIG. 1 is a cross-sectional view outlining the thermally expandable sheet according to Embodiment 1.

As illustrated in FIG. 1, a thermally expandable sheet 10 according to Embodiment 1 includes a base 11, a thermally expansive layer 12, a first ink receiving layer 13, a film 14, and a second ink receiving layer 15.

The base 11 is implemented as a sheet-like member supporting the thermally expansive layer 12 and the like. The thermally expansive layer 12 is formed on a first surface (the front surface, the top surface in FIG. 1) of the base 11. Paper such as high-quality paper, or a sheet (including films) made from a resin such as polyethylene terephthalate (PET) is used as the base 11. The base 11 is not limited to a sheet made from PET, and a sheet formed by appropriately selecting from materials such as conventionally used polyolefin resins such as polyethylene and polypropylene, polyester resins, polyamide resins such as nylon, polyvinyl chloride resins, and polyimide resins can be used. The base 11 has sufficient strength so that, when the thermally expansive layer 12 distends in part or in whole due to foaming, the opposite side of the base 11 (the underside illustrated in FIG. 1) does not bulge, and wrinkles, large undulations, and the like do not form. Additionally, the base 11 has heat resistance sufficient to resist the heating carried out to foam the thermally expansive layer 12. Moreover, as described later, an electromagnetic wave heat conversion layer used to cause the thermally expansive layer 12 to distend is formed on the other surface (the back surface, the bottom surface illustrated in FIG. 1) of the base 11. As such, when the base 11 is formed of a resin such as PET, an ink receiving layer for facilitating the reception of the ink used as the electromagnetic wave heat conversion layer may be further formed on the other surface (the back surface, the bottom surface illustrated in FIG. 1) of the base 11.

The thermally expansive layer 12 is formed on a first surface (the top surface in FIG. 1) of the base 11. The thermally expansive layer 12 is a layer that distends a magnitude according to the heating temperature and the heating time, and contains a plurality of thermally expandable materials (thermally expandable microcapsules, microcapsules) dispersed in a binder. While described in detail later, in this embodiment, an electromagnetic wave heat conversion layer (hereinafter also referred to simply as "heat conversion layer") converting electromagnetic waves to heat is formed on the other surface (the back surface) of the base 11 and is irradiated with electromagnetic waves to cause the regions where the electromagnetic wave heat conversion layer is provided to generate heat. The electromagnetic wave heat conversion layer is heated due to being irradiated with electromagnetic waves and, as such, is also called a "heated layer." The thermally expansive layer 12 absorbs the heat generated by the electromagnetic wave heat conversion layer on the back surface of the thermally expandable sheet 10, foams, and distends such that the layer surface of the thermally expansive layer 12 bulges, as least in part. Using this feature, it is possible to selectively cause only a specific region of the thermally expandable sheet 10 to distend to a desired shape by adjusting the density and the shape of the electromagnetic wave heat conversion layer.

A thermoplastic resin such as an ethylene-vinyl-acetate polymer or an acrylic polymer is used as the binder of the thermally expansive layer 12. The thermally expandable microcapsules contain propane, butane, or a similar low boiling point volatile substance in thermoplastic resin shells. The shells are formed of a thermoplastic resin such as, for example, polystyrene, polyvinyl chloride, polyvinylidene chloride, polyvinyl acetate, polyacrylic acid ester, polyacrylonitrile, polybutadiene, and copolymers thereof. The average particle size of the thermally expandable microcapsules is about 5 to 50 μm. When these microcapsules are heated to the thermal expansion start temperature or higher, the polymer shells that are made from the resin soften and the low boiling point volatile substance encapsulated therein vaporizes. The pressure resulting from this vaporization causes the capsules to distend. While dependent on the characteristics of the microcapsules to be used, the microcapsules distend to a size about five-times larger than that prior to distending. Note that there is variance in the particle sizes of the microcapsules and all of the microcapsules do not have the same particle size. Also, the thermally expansive layer 12 is white, for example.

The first ink receiving layer 13 is formed on the thermally expansive layer 12. The first ink receiving layer 13 is a layer receiving and fixing ink used in a printing step, such as ink of an inkjet printer. The first ink receiving layer 13 is formed using a known material according to the ink to be used in the printing step. For example, when a water-based ink is to be used, for layer types that use gaps to receive the ink, the first ink receiving layer 13 is formed using porous silica, alumina, or the like. In layer types that use gaps to receive the ink, a so-called matte texture is obtained and the forming coating thereof is white. In layer types that swell to receive the ink, the first ink receiving layer 13 is formed using a resin selected from, at least one of, for example, a polyvinyl alcohol (PVA) resin, a polyester resin, a polyurethane resin, an acrylic resin, or the like. In layer types that swell to receive the ink, a so-called glossy texture is obtained and the forming coating thereof is substantially transparent. In this embodiment, in one example, the first ink receiving layer 13 is formed of a material providing a so-called matte (non-glossy) texture and is formed of porous silica, for example. In this case, the image formed on the first ink receiving layer 13 provides a non-glossy matte texture. In the present disclosure, the PVA resin contains polyvinyl alcohol, derivatives, and/or copolymers thereof. Moreover, the same applies to polyester resin, polyurethane resin, and acrylic resin.

The film 14 is formed on the first ink receiving layer 13. As described in detail later, the film 14 is removed by peeling off in part or in whole depending on the texture required for the 2.5D image formed on the front side of the thermally expandable sheet 10 and, as such, is peelably adhered on the first ink receiving layer 13. The film 14 is made from resin and is formed of a resin selected from, for example, polyethylenes, polyvinyl alcohols, polypropylenes, polyvinyl chlorides, polyamides, polyurethanes, polyesters, and copolymers thereof. In one example, the film 14 is formed of ethylene-vinyl alcohol copolymer. Note that the film 14 is not limited to a single layer film, and may be a laminate film having a plurality of layers.

The second ink receiving layer 15 is formed on the film 14. Like the first ink receiving layer 13, the second ink receiving layer 15 receives and fixes ink used in a printing step, such as ink of an inkjet printer. The second ink receiving layer 15 is formed using a general-purpose material according to the ink to be used in the printing step. For example, when a water-based ink is to be used, in layer types that use gaps to receive the ink, the second ink receiving layer 15 is formed using porous silica, alumina, or the like. In layer types that swell to receive the ink, the second ink receiving layer 15 is formed using a resin selected from, for example, a polyvinyl alcohol (PVA) resin, a polyester resin, a polyurethane resin, an acrylic resin, and the like.

Particularly in this embodiment, the first ink receiving layer 13 and the second ink receiving layer 15 must provide different textures and, therefore, the second ink receiving layer 15 is formed of a material different from the material of the first ink receiving layer 13. The first ink receiving layer 13 and the second ink receiving layer 15 may be formed of any material as long as the texture provided by the material of the first ink receiving layer 13 is different from the texture provided by the material of the second ink receiving layer 15. For example, in this embodiment, when the first ink receiving layer is formed of porous silica providing a so-called matte texture, the second ink receiving layer 15 is formed of PVA providing a so-called glossy texture or the like. Note that other combinations and reverse combinations are also possible. Particularly, since the second ink receiving layer 15 is formed on the film 14 made from resin, it is preferable that the layer type that swells to receive the ink is used because such a configuration will lead to improved adhesion between the second ink receiving layer 15 and the film 14. Additionally, the ink can be dried faster compared to the swelling layer type by using the gap type layer such as porous silica to form the first ink receiving layer 13. Accordingly, the time to dry the ink can be shortened, the time required to transition from step S3 to step S5 in FIG. 5 (described later) can be shortened, and the transition from step S4 to S5 can be made smoothly.

By using materials providing different textures for the first ink receiving layer 13 and the second ink receiving layer 15, as described in detail later, it is possible to form 2.5D images of varying textures on the front side of the thermally expandable sheet 10.

Production Method of Thermally Expandable Sheet 10

Next, the production method of the thermally expandable sheet 10 will be described using FIGS. 2A to 2D and FIG. 3.

First, sheet-like paper is prepared as the base 11. For example, a roll of paper is used as the base 11. However, the form of the paper is not limited to a roll in the production method described hereinafter, and individual sheets may be used.

Figure 2A:
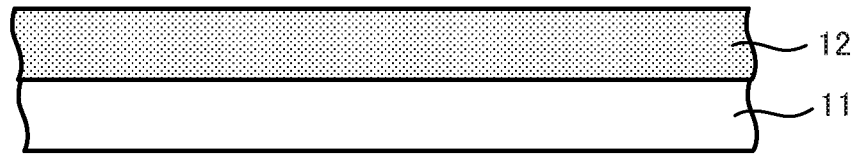
FIGS. 2A to 2D are cross-sectional views outlining the production method for the thermally expandable sheet according to Embodiment 1.

Next, the binder including the thermoplastic resin and the like is mixed with the thermally expandable material (the thermally expandable microcapsules) to prepare a coating liquid for forming the thermally expansive layer 12. Then, using a known coating device such as a bar coater, a roll coater, or a spray coater, the coating liquid is applied on a first surface (the top surface illustrated in FIG. 2A) of the base 11. Next, the coated film is dried and, as illustrated in FIG. 2A, the thermally expansive layer 12 is formed. Note that, the application and the drying of the coating liquid may be carried out a plurality of times in order to obtain the target thickness of the thermally expansive layer 12.

Figure 2B:
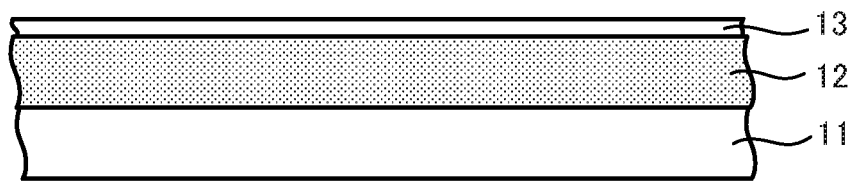

Next, a coating liquid is prepared using the material of the first ink receiving layer 13, such as porous silica. Then, using a known coating device of a system such as a bar coater, a roll coater, or a spray coater, this coating liquid is applied on the thermally expansive layer 12. Note that, the application and the drying of the coating liquid may be carried out a plurality of times in order to obtain the target thickness of the first ink receiving layer 13. Next, the coated film is dried and, as illustrated in FIG. 2B, the first ink receiving layer 13 is formed.

Figure 2C:
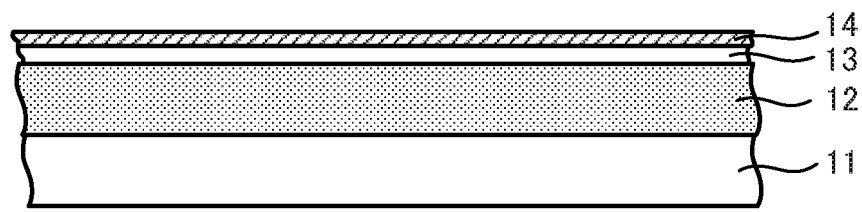
Figure 3:
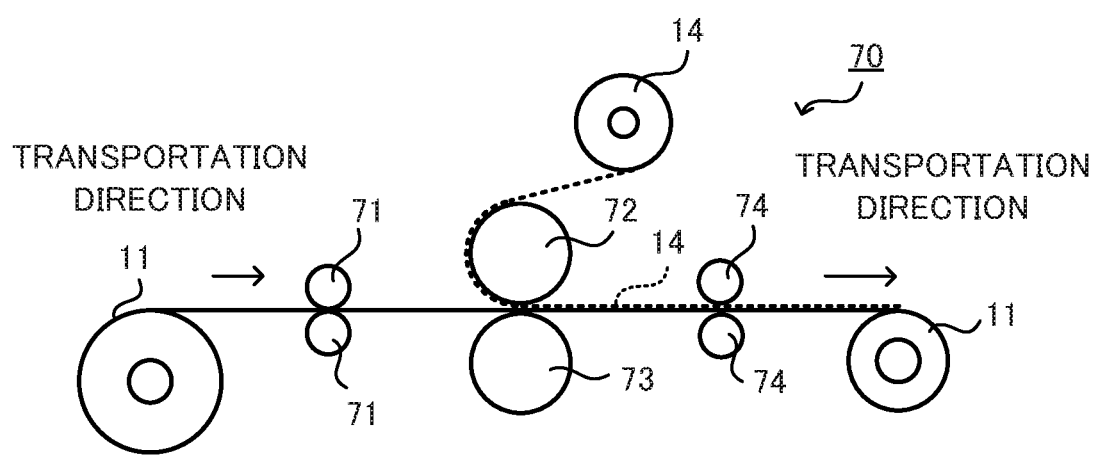
FIG. 3 is a drawing outlining the laminating apparatus used in the production of the thermally expandable sheet according to Embodiment 1.

Next, using the laminating apparatus 70 illustrated in FIG. 3, the film 14 is affixed on the first ink receiving layer 13. As illustrated in FIG. 3, the laminating apparatus 70 includes input rollers 71, a heater roller 72, a roller 73, and output rollers 74. While in a wound state, the base 11 on which the thermally expansive layer 12 and the first ink receiving layer 13 have been formed is placed at a feeding position of the apparatus. The base 11 is transported toward the input rollers 71. The base 11 passes between the pair of input rollers 71 and is transported toward the heater roller 72 and the roller 73. The film 14 is fed to the heater roller 72. When the film 14 is heated by the heater roller 72 and passes between the heater roller 72 and the roller 73, pressure is applied and the film 14 is peelably adhered to the base 11 (the first ink receiving layer 13). After the film 14 has been adhered, the base 11 passes between the pair of output rollers 74, is transported, and wound up. Thus, the film 14 is affixed, as illustrated in FIG. 2C.

Figure 2D:
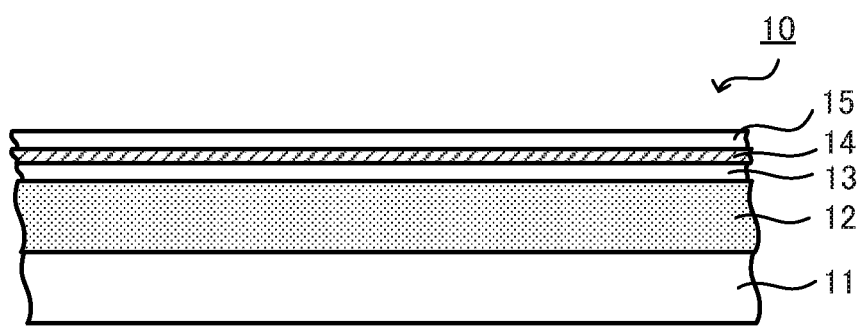

Next, a coating liquid is prepared using the material of the second ink receiving layer 15, such as a material selected from PVA and the like. Here, in this embodiment, the second ink receiving layer 15 is formed using a different material than the first ink receiving layer 13. Then, using a known coating device of a system such as a bar coater, a roll coater, or a spray coater, this coating liquid is applied on the film 14. Note that, the application and the drying of the coating liquid may be carried out a plurality of times in order to obtain the target thickness of the second ink receiving layer 15. Next, the coated film is dried and, as illustrated in FIG. 2D, the second ink receiving layer 15 is formed. Additionally, when using the base 11 having a roll form, cutting to a size suitable for the 2.5D image forming system 50 is performed.

Note that the present disclosure is not limited to configurations in which the second ink receiving layer 15 is formed using a coating liquid. For example, a film in which the ink receiving layer 23 is formed in advance on the front surface thereof may be used as the film 14. In this case, the film 14 is affixed such that the pre-formed ink receiving layer does not to face the first ink receiving layer 13 or, in other words, such that the pre-formed ink receiving layer is positioned on the top surface of the film 14, as illustrated in FIG. 2D. As a result, the ink receiving layer pre-formed on the film 14 can be used as the second ink receiving layer 15.

The thermally expandable sheet 10 is produced by the steps described above.

2.5D Image Forming System

Figure 4A:
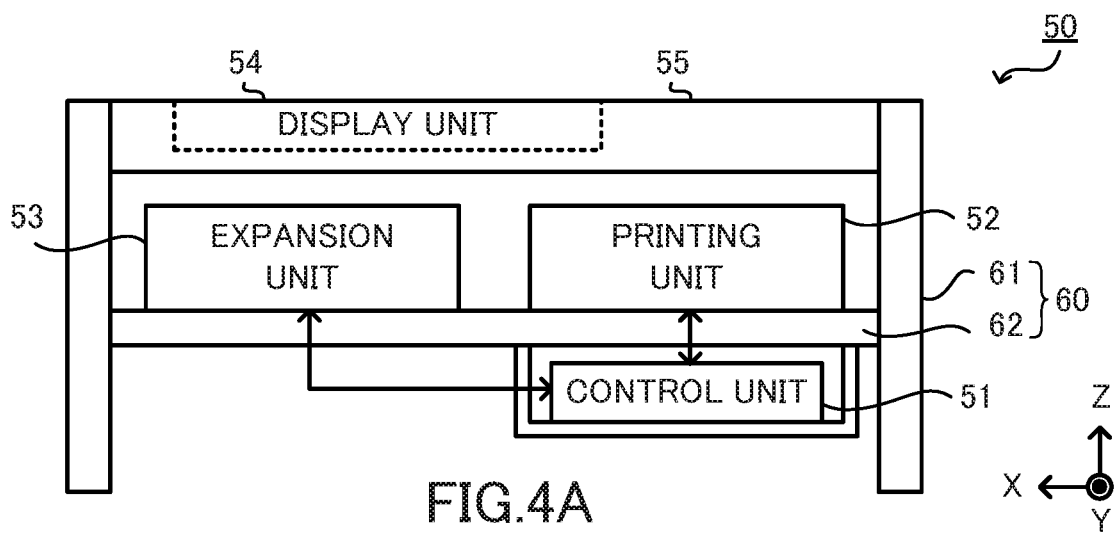
FIGS. 4A to 4C are drawings outlining the 2.5D image forming system according to Embodiment 1.
Figure 4B:
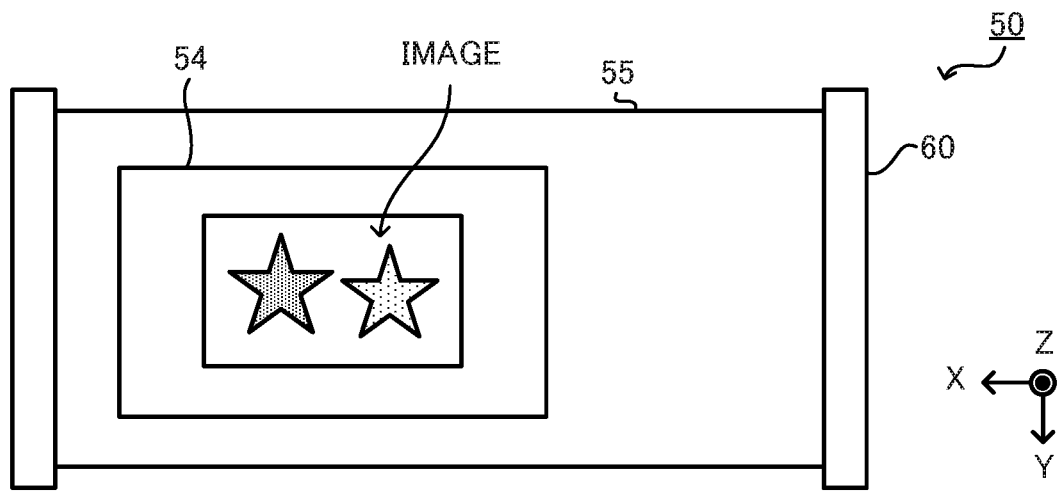
Figure 4C:
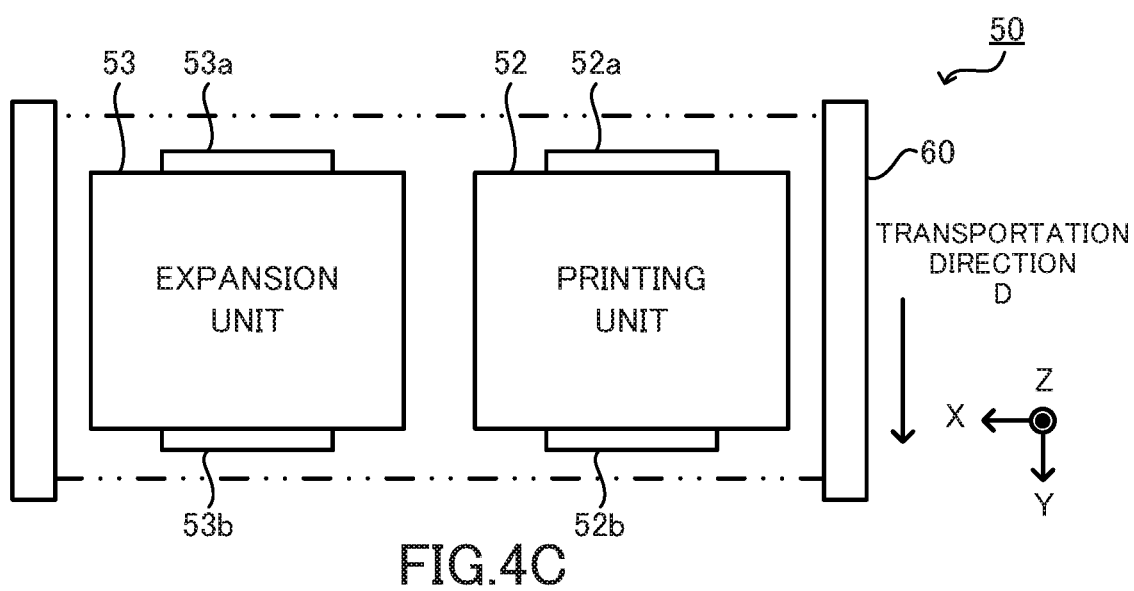

Next, a description will be given of the 2.5D image forming system 50 that forms 2.5D images on the thermally expandable sheet 10 of this embodiment. As illustrated in FIGS. 4A to 4C, the 2.5D image forming system 50 includes a control unit 51, a printing unit 52, an expansion unit 53, a display unit 54, a top plate 55, and a frame 60. FIG. 4A is a front view of the 2.5D image forming system 50; FIG. 4B is a plan view of the 2.5D image forming system 50 with the top plate 55 closed; and FIG. 4C is a plan view of the 2.5D image forming system 50 with the top plate 55 open. In FIGS. 4A to 4C, the X-direction is the same as the horizontal direction, the Y-direction is the same as a transport direction D in which the sheet is transported, and the Z-direction is the same as the vertical direction. The X-direction, the Y-direction, and the Z-direction are orthogonal to each other.

The control unit 51, the printing unit 52, and the expansion unit 53 are each mounted in the frame 60 as illustrated in FIG. 4A. Specifically, the frame 60 includes a pair of substantially rectangular sideboards 61 and a coupling beam 62 provided between the sideboards 61. The top plate 55 spans between upper portions of the sideboards 61. The printing unit 52 and the expansion unit 53 are juxtaposed in the X-direction on the coupling beam 62 that spans between the sideboards 61, and the control unit 51 is fixed below the coupling beam 62. The display unit 54 is embedded in the top plate 55 to be flush with the top surface of the top plate 55.

The control unit 51 includes a central processing unit (CPU), read only memory (ROM), random access memory (RAM), and the like, and controls the printing unit 52, the expansion unit 53, and the display unit 54.

The printing unit 52 is a printing device of an inkjet system. As illustrated in FIG. 4C, the printing unit 52 includes an introducer 52a for introducing the thermally expandable sheet 10, and a discharger 52b for discharging the thermally expandable sheet 10. The printing unit 52 prints a designated image on the front surface or the back surface of the thermally expandable sheet 10 loaded through the introducer 52a, and discharges the thermally expandable sheet 10 on which the image has been printed through the discharger 52b. Additionally, the printing unit 52 includes color inks (cyan (C), magenta (M), and yellow (Y)) for forming color ink layers 41 and 42 (described later), and black ink (containing carbon black) for forming a back side heat conversion layers (the electromagnetic wave heat conversion layer) 44a and 44b. Note that the printing unit 52 may also include a black color ink free of carbon black as a color ink for forming black or gray color in the color ink layers 41 and 42.

The printing unit 52 acquires, from the control unit, color image data presenting a color image (color ink layer) to be printed on the front surface of the thermally expandable sheet 10, and prints the color images (color ink layers 41 and 42) using the color inks (cyan (C), magenta (M), and yellow (Y)) on the basis of the color image data. Black or gray color in the color ink layers 41 and 42 is formed by blending the three CMY colors or is formed by using the black color ink free of carbon black. Note that, in this embodiment, a first color image (the first color ink layer 41) is formed on the first ink receiving layer 13 on the basis of first color image data. A second color image (the second color ink layer 42) is formed on the second ink receiving layer 15 on the basis of second color image data.

The printing unit 52 prints the back side heat conversion layers 44a and 44b on the basis of back side foaming data using the black ink. This back side foaming data is data that indicates the portion of the back surface of the thermally expandable sheet 10 to be foamed and caused to distend. The black ink free of carbon black is an example of a material that converts electromagnetic waves to heat. The distension height of the thermally expansive layer 12 corresponds to the density of the black ink, and greater densities lead to greater distension heights. As such, the gradation is determined so that the density of the black ink corresponds to the target height.

The expansion unit 53 is an expansion device that applies heat to the thermally expandable sheet 10 to cause distension. As illustrated in FIG. 4C, the expansion unit 53 includes an introducer 53a for introducing the thermally expandable sheet 10, and a discharger 53b for discharging the thermally expandable sheet 10. The expansion unit 53 applies heat to the thermally expandable sheet 10 loaded through the introducer 53a thereby causing the thermally expandable sheet 10 to distend, and discharges the distended thermally expandable sheet 10 through the discharger 53b. An irradiator (not illustrated in the drawings) is provided in the expansion unit 53. In one example, the irradiator is a halogen lamp that emits, at the thermally expandable sheet 10, light (electromagnetic waves) in the near-infrared region (750 to 1400 nm wavelength range), the visible light spectrum (380 to 750 nm wavelength range), or the intermediate infrared region (1400 to 4000 nm wavelength range). When the thermally expandable sheet 10, on which black ink containing carbon black is printed, is irradiated with electromagnetic waves, the portions where the black ink is printed convert the electromagnetic waves to heat more efficiently than the portions where the black ink is not printed. As such, the regions of the thermally expansive layer 12 where the black ink is printed are primarily heated and, as a result, the regions of the thermally expansive layer 12 where the black ink is printed distend. Note that the irradiator is not limited to a halogen lamp and other configurations may be used provided that it is possible to emit electromagnetic waves. Moreover, the wavelengths of the electromagnetic waves are not limited to the ranges described above.

The display unit 54 is implemented as a touch panel or the like. In the example illustrated in FIG. 4B, the display unit 54 displays an image (the stars illustrated in FIG. 4B) printed on the thermally expandable sheet 10 by the printing unit 52.

Additionally, the display unit 54 displays operating instructions or the like, so that the user can operate the 2.5D image forming system 50 by touching the display unit 54.

2.5D Image Forming Processing

Figure 6A:
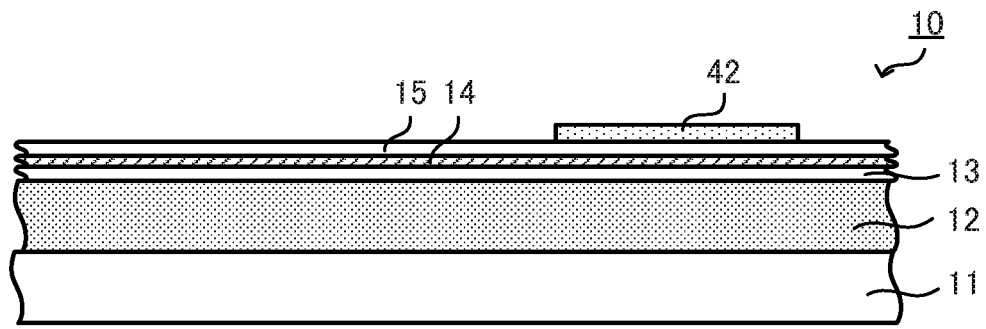
FIGS. 6A to 6F are cross-sectional views schematically illustrating the 2.5D image forming method according to Embodiment 1.
Figure 6B:
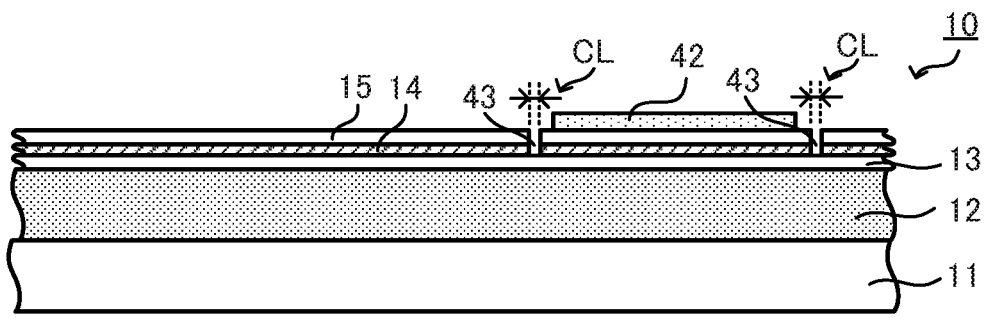
Figure 6C:
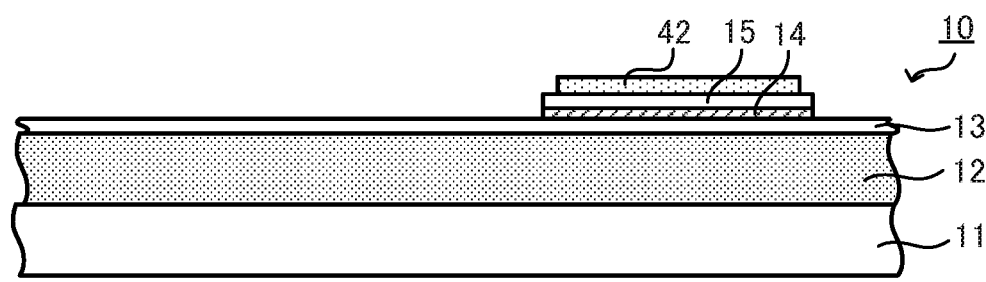
Figure 6D:
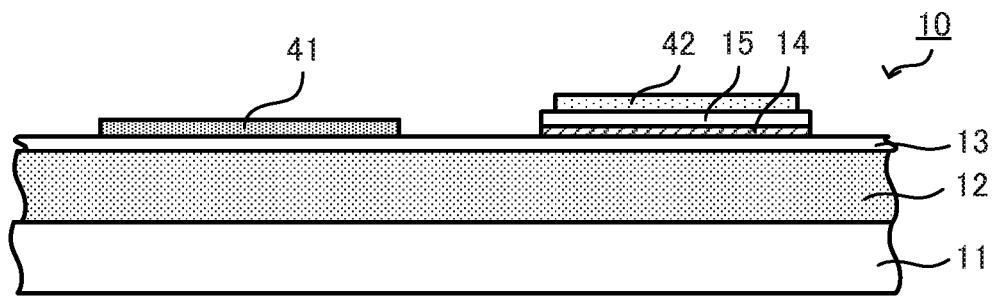
Figure 6E:
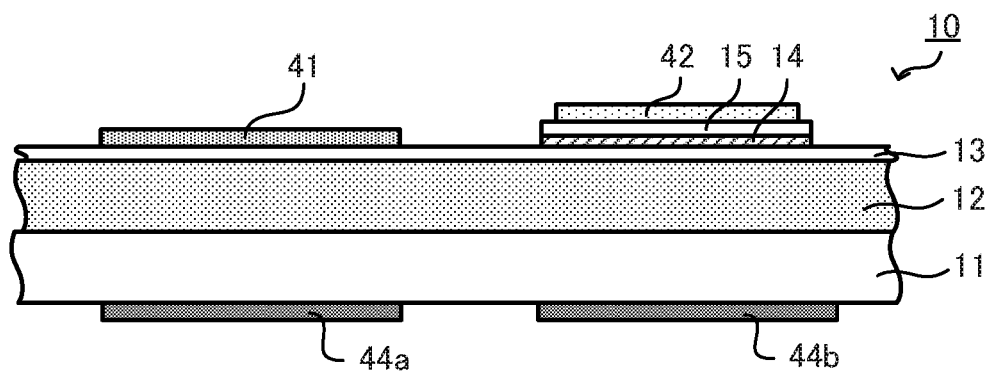
Figure 6F:
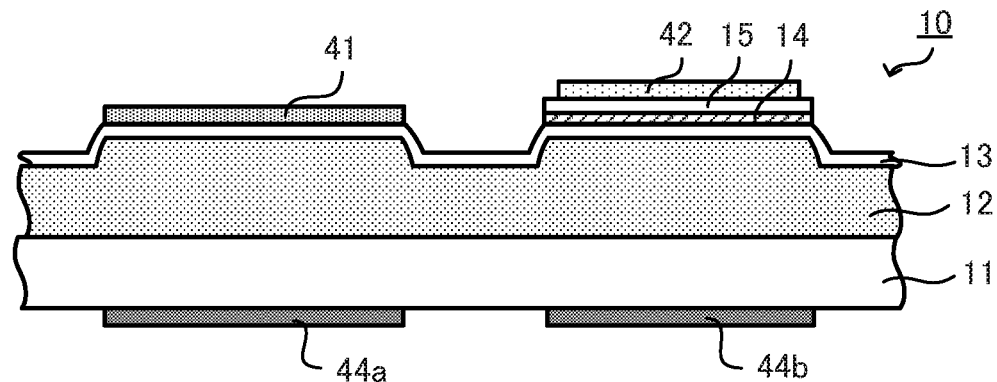
Figure 7A:
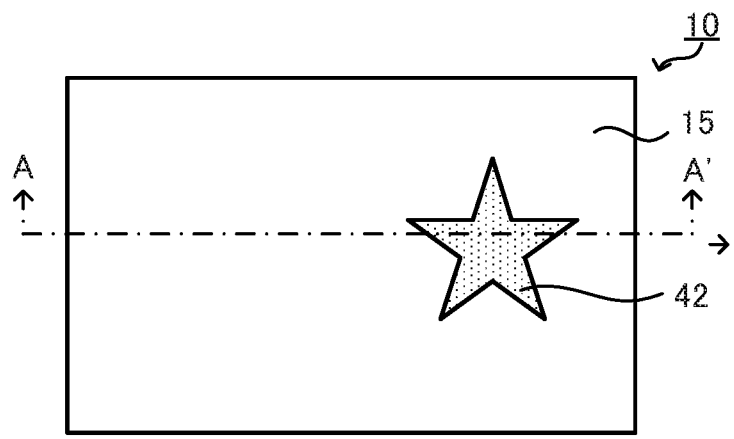
FIGS. 7A to 7C are plan views schematically illustrating the 2.5D image forming method according to Embodiment 1.
Figure 7B:
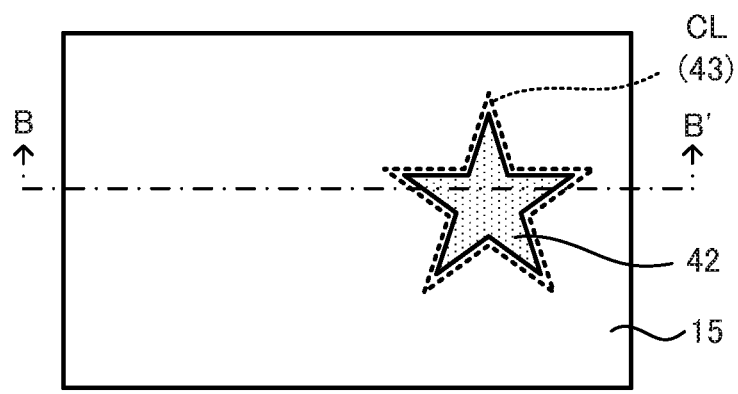
Figure 7C:
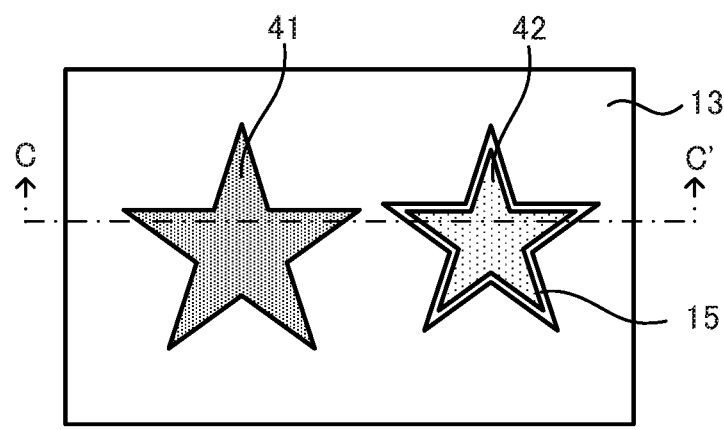

Next, an explanation will be given of the flow of processing whereby a 2.5D image is formed on the thermally expandable sheet 10 by the 2.5D image forming system 50, while referencing the flowchart illustrated in FIG. 5, the cross-sectional views of the thermally expandable sheet 10 illustrated in FIGS. 6A to 6F, and the plan views illustrated in FIGS. 7A to 7C.

First, a user prepares a thermally expandable sheet 10 on which a 2.5D image has not been formed, and designates the first color image data, the second color image data, and the back side foaming data using the display unit 54. Then, the user inserts the thermally expandable sheet 10 into the printing unit 52 with the front surface facing upward. The printing unit 52 prints the second color ink layer 42 on the front side (the second ink receiving layer 15) of the inserted thermally expandable sheet 10 (step S1). Specifically, the printing unit 52 discharges the various cyan (C), magenta (M), and yellow (Y) inks onto the front surface of the thermally expandable sheet 10 in accordance with the designated second color image data. As a result, the second color ink layer 42 is formed on the second ink receiving layer 15, as illustrated in FIG. 6A. FIG. 7A is a plan view illustrating a state in which the second color ink layer 42 has been printed, and a cross-sectional view taken along line A-A' illustrated in FIG. 7A corresponds to FIG. 6A. Note that, in FIG. 6A, both ends of the cross-sectional view taken along line A-A' are omitted. As illustrated in FIG. 6A and FIG. 7A, at the completion of step S1, the film 14 is provided on the entire front surface of the thermally expandable sheet 10, and the second ink receiving layer 15 is present on the front surface of the thermally expandable sheet 10.

Second, the user forms a notch 43 in the second ink receiving layer 15 and the film 14 along a cutting line CL so as to make it possible to, after peeling off the film 14, leave only the region where the second color ink layer 42 is formed, and the region near the periphery of the second color ink layer 42, of the film 14 (step S2).

The notch 43 can be formed using a desired tool, such as a knife. As a result, the notch 43 is formed in the second ink receiving layer 15 and the film 14, as illustrated in FIG. 6B. FIG. 7B is a plan view illustrating a state in which the second color ink layer 42 has been printed, and a cross-sectional view taken along line B-B' illustrated in FIG. 7B corresponds to FIG. 6B. Note that, in FIG. 6B, both ends of the cross-sectional view taken along line B-B' are omitted. As illustrated in FIG. 6B and FIG. 7B, at the completion of step S2, the film 14 is provided on the entire front surface of the thermally expandable sheet 10, and the second ink receiving layer 15 is present on the front surface of the thermally expandable sheet 10. Furthermore, the notch 43 is formed along the cutting line CL around the second color ink layer 42.

Note that the cutting line CL is not limited to the configuration illustrated in the drawings, and may be provided at any location, provided that the region where the second color ink layer 42 is printed remains after removing the film 14. In one example, it is possible to provide the cutting line CL in the vicinity of the region where the first color ink layer 41 is to be formed in step S4 (described later) so that only the region where the first color ink layer 41 is formed can be peeled off. Alternatively, the cutting line CL may be provided between the region where the first color ink layer 41 is formed and the region where the second color ink layer 42 is formed. In addition, the timing at which the notch is formed in the film 14 is not limited to the examples described in this embodiment. For example, it is possible to form the notch 43 prior to printing the second color ink layer 42 or, in other words, it is possible to switch steps S1 and S2.

Furthermore, it is possible to insert the notch 43 when the thermally expandable sheet 10 is produced.

Moreover, the notch 43 may extend to the layers below the film 14, namely the first ink receiving layer 13 and the thermally expansive layer 12.

Thirdly, the user removes by peeling off the film 14 while leaving the region where the second color ink layer 42 is formed (step S3). As a result, the first ink receiving layer 13 is partially exposed, as illustrated in FIG. 6C.

Fourthly, the user inserts the thermally expandable sheet 10, from which a portion of the film 14 has been removed, into the printing unit 52 with the front side facing upward. The printing unit 52 prints the first color ink layer 41 on the front surface (the first ink receiving layer 13) of the inserted thermally expandable sheet 10 (step S4). Specifically, the printing unit 52 discharges the various cyan (C), magenta (M), and yellow (Y) inks onto the front side of the thermally expandable sheet 10 in accordance with the designated first color image data. As a result, the first color ink layer 41 is formed on the first ink receiving layer 13, as illustrated in FIG. 6D. FIG. 7C is a plan view illustrating a state in which the first color ink layer 41 has been printed, and a cross-sectional view taken along line C-C' illustrated in FIG. 7C corresponds to FIG. 6D. Note that, in FIG. 6D, both ends of the cross-sectional view taken along line C-C' are omitted. As illustrated in FIG. 7C, at the completion of step S4, the film 14 is present only below the second color ink layer 42, and the first ink receiving layer 13 is exposed around the periphery of the second color ink layer 42. Additionally, the first color ink layer 41 is formed on the first ink receiving layer 13, as illustrated in the drawing.

Fifthly, the user inserts the thermally expandable sheet 10, onto which the first color ink layer 41 and the second color ink layer 42 have been printed, into the printing unit 52 with the back side facing upward. The printing unit 52 prints heat conversion layers (the back side heat conversion layers 44a and 44b) on the back side of the inserted thermally expandable sheet 10 (step S5). The back side heat conversion layers 44a and 44b are layers that are formed by a black ink containing a material that converts electromagnetic waves to heat, namely carbon black. The printing unit 52 discharges the black ink containing carbon black onto the back side of the thermally expandable sheet 10 in accordance with the designated back side foaming data. As a result, the back side heat conversion layers 44a and 44b are formed on the back surface of the base 11, as illustrated in FIG. 6E. Note that the density of the black ink of the back side heat conversion layers 44a and 44b can be increased to cause the printed region to distend higher. Additionally, it is possible to vary the density within the back side heat conversion layers 44a and 44b so as to obtain a variety of distension heights. In FIG. 6E, since the thermally expansive layer 12 is distended in the region where the first color ink layer 41 is formed, the back side heat conversion layer 44a is formed on the back surface of the base 11 in a region opposing at least a portion of the first color ink layer 41 across the base 11 and the thermally expansive layer 12. Likewise, since the thermally expansive layer 12 is distended in the region where the second color ink layer 42 is formed, the back side heat conversion layer 44b is formed on the back surface of the base 11 in a region opposing at least a portion of the second color ink layer 42 across the base 11 and the thermally expansive layer 12.

Sixthly, the user inserts the thermally expandable sheet 10, onto which the back side heat conversion layers 44a and 44b have been printed, into the expansion unit 53 with the back side facing upward. The expansion unit 53 irradiates electromagnetic waves and heats the inserted thermally expandable sheet 10 from the back side (step S6). Specifically, the irradiator (not illustrated in the drawings) of the expansion unit 53 irradiates the back side of the thermally expandable sheet 10 with electromagnetic waves. The back side heat conversion layers 44a and 44b printed on the back surface of the thermally expandable sheet 10 absorb the irradiated electromagnetic waves, thereby generating heat. As a result, as illustrated in FIG. 6F, the region of the thermally expandable sheet 10 where the back side heat conversion layers 44a and 44b are printed foams and distends.

A 2.5D image is formed on the thermally expandable sheet 10 as a result of carrying out the procedures described above.

In this embodiment, materials providing different textures are used for the second ink receiving layer 15 provided on the top surface of the film 14 and the first ink receiving layer 13 provided on the bottom surface of the film 14, and at least a portion of the film 14 is removed by peeling off to expose the first ink receiving layer 13. As a result, a 2.5D image providing varying textures can be formed on one thermally expandable sheet 10. For example, in the example illustrated in FIG. 7C, it is possible to configure the star formed on the first ink receiving layer 13 as a 2.5D image providing a matte texture and the star formed on the second ink receiving layer 15 as a 2.5D image providing a glossy texture.

Embodiment 2

Next, 2.5D image forming processing according to Embodiment 2 will be described in detail below using the drawings. The 2.5D image forming processing according to Embodiment 2 differs from the 2.5D image forming processing according to Embodiment 1 in that an electromagnetic wave heat conversion layer is also formed on the front surface of the thermally expandable sheet. The thermally expandable sheet, the production method for the thermally expandable sheet, and the 2.5D image forming system are the same as described in Embodiment 1 and, as such, detailed description thereof is forgone. Furthermore, descriptions of constituents that are the same as those described in Embodiment 1 are forgone.

2.5D Image Forming Processing

Figure 8:
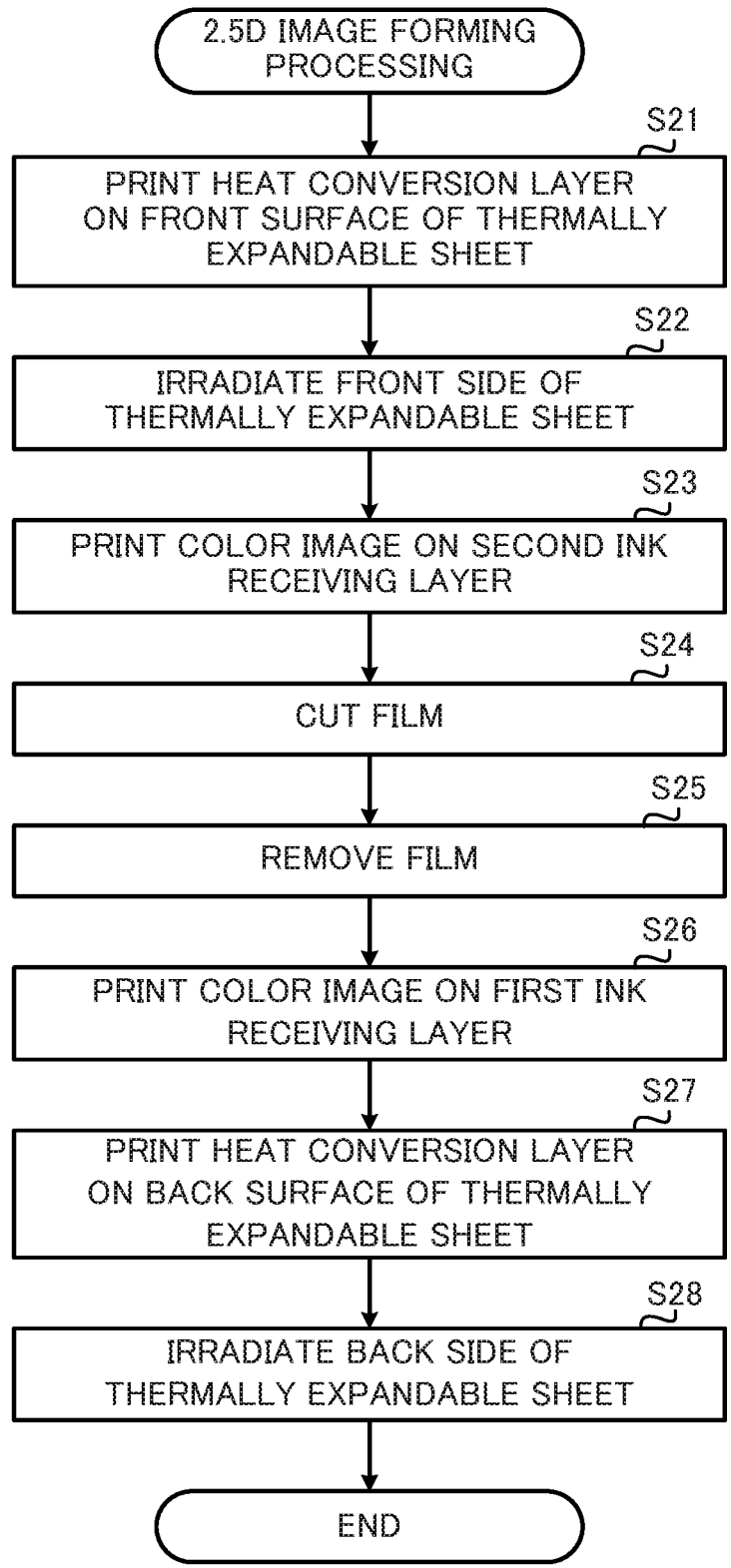
FIG. 8 is a flowchart illustrating the 2.5D image forming process according to Embodiment 2.

Next, an explanation will be given of the flow of processing whereby a 2.5D image is formed on the thermally expandable sheet 10 by the 2.5D image forming system 50, while referencing the flowchart illustrated in FIG. 8, the cross-sectional views of the thermally expandable sheet 10 illustrated in FIGS. 9A to 10H, and the plan views illustrated in FIGS. 11A to 11D.

Figure 9A:
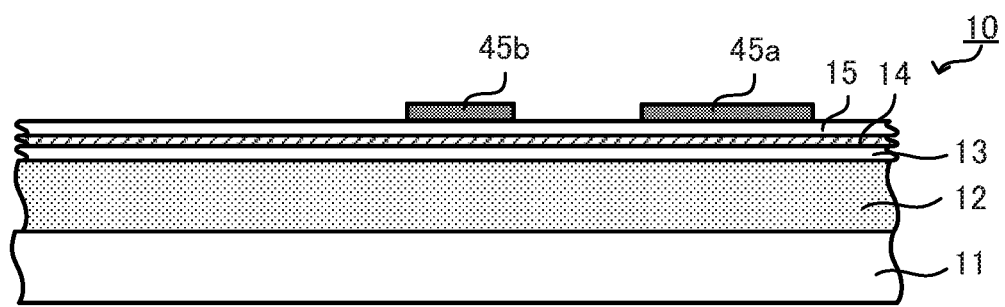
FIGS. 9A to 9D are cross-sectional views schematically illustrating the 2.5D image forming method according to Embodiment 2.
Figure 11A:
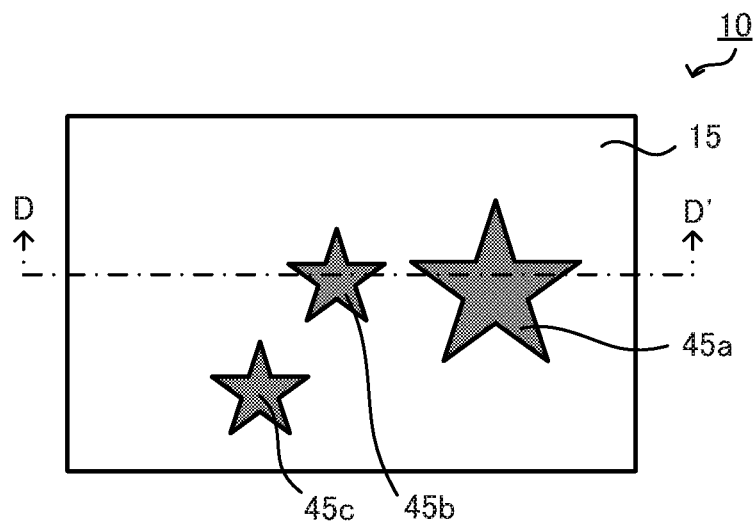
FIGS. 11A to 11D are plan views schematically illustrating the 2.5D image forming method according to Embodiment 2.

First, a user prepares a thermally expandable sheet 10 on which a 2.5D image has not been formed, and designates the first color image data, the second color image data, front side foaming data, and the back side foaming data using the display unit 54. Then, the user inserts the thermally expandable sheet 10 into the printing unit 52 with the front side facing upward. The printing unit 52 prints heat conversion layers (front side heat conversion layers 45a to 45c) on the front surface (on the second ink receiving layer 15) of the inserted thermally expandable sheet 10 (step S21). The front side heat conversion layers 45a to 45c are layers that are formed by a black ink containing a material that converts electromagnetic waves to heat, namely carbon black. The printing unit 52 discharges the black ink containing carbon black onto the front surface of the thermally expandable sheet 10 in accordance with the designated front side foaming data. As a result, the front side heat conversion layers 45a to 45c are formed on the second ink receiving layer 15, as illustrated in FIG. 9A and FIG. 11A. As in Embodiment 1, to facilitate comprehension, in FIG. 9A, an example is illustrated in which the front side heat conversion layers 45a and 45b are formed on the second ink receiving layer 15. FIG. 11A is a plan view illustrating a state in which the front side heat conversion layers 45a to 45c have been printed, and a cross-sectional view taken along line D-D' illustrated in FIG. 11A corresponds to FIG. 9A. Note that, in FIG. 9A, both ends of the cross-sectional view taken along line D-D' are omitted. As illustrated in FIG. 9A and FIG. 11A, at the completion of step S21, the film 14 is provided on the entire front surface of the thermally expandable sheet 10, and the second ink receiving layer 15 is present on the front surface of the thermally expandable sheet 10.

Figure 9B:
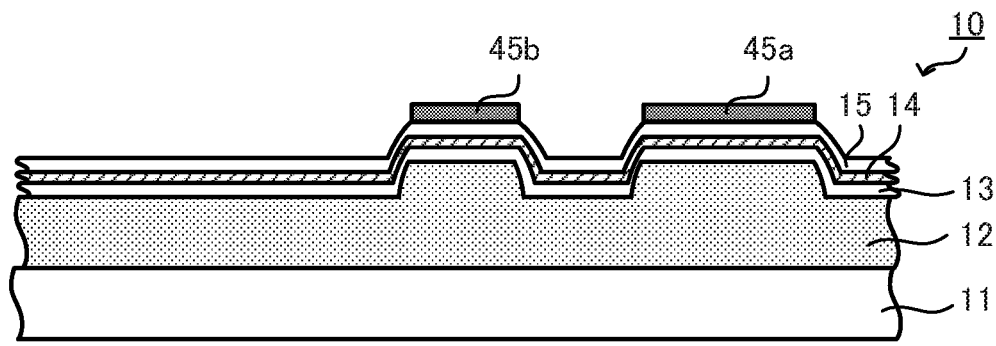

Secondly, the user inserts the thermally expandable sheet 10 onto which the front side heat conversion layers 45a to 45c have been printed into the expansion unit 53 with the front side facing upward. The expansion unit 53 irradiates electromagnetic waves and heats the inserted thermally expandable sheet 10 from the front side (step S22). Specifically, the irradiator of the expansion unit 53 irradiates the front side of the thermally expandable sheet 10 with electromagnetic waves. The front side heat conversion layers 45a to 45c printed on the front surface of the thermally expandable sheet 10 absorb the irradiated electromagnetic waves, thereby generating heat. As a result, as illustrated in FIG. 9B, the regions of the thermally expandable sheet 10 where the front side heat conversion layers 45a to 45c are printed rise and distend.

Figure 9C:
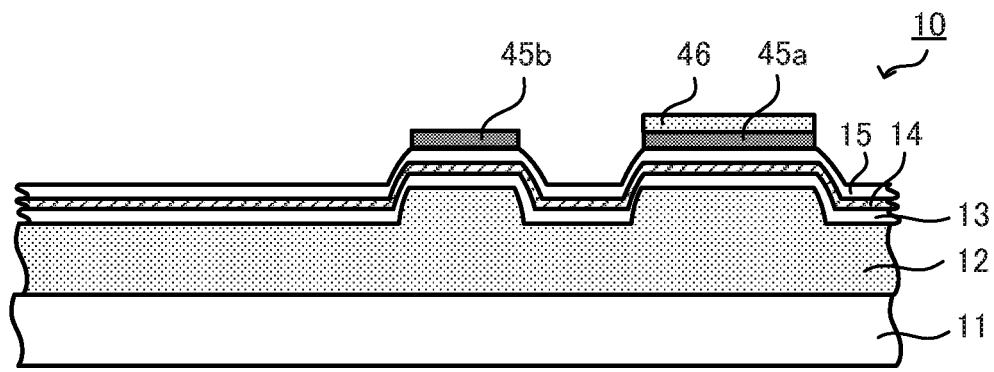

Thirdly, the user inserts the thermally expandable sheet 10 into the printing unit 52 with the front side facing upward. The printing unit 52 prints the second color ink layer 46 on the front surface (on the second ink receiving layer 15) of the inserted thermally expandable sheet 10 (step S23). Specifically, the printing unit 52 discharges the various cyan (C), magenta (M), and yellow (Y) inks onto the front surface of the thermally expandable sheet 10 in accordance with the designated second color image data. As a result, the second color ink layer 46 is formed on the second ink receiving layer 15, as illustrated in FIG. 9C. In this embodiment, the second color ink layer 46 is formed only on the front side heat conversion layer 45a. Note that, at the completion of step S23, the film 14 is provided on the entire front surface of the thermally expandable sheet 10.

Figure 9D:
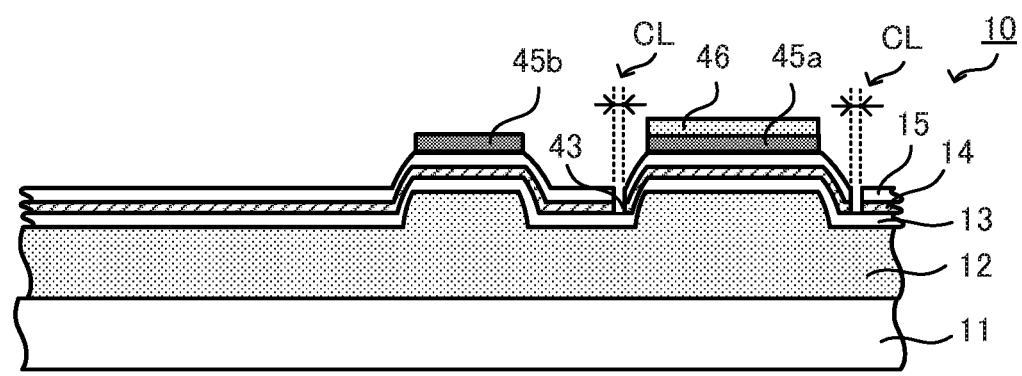
Figure 11B:
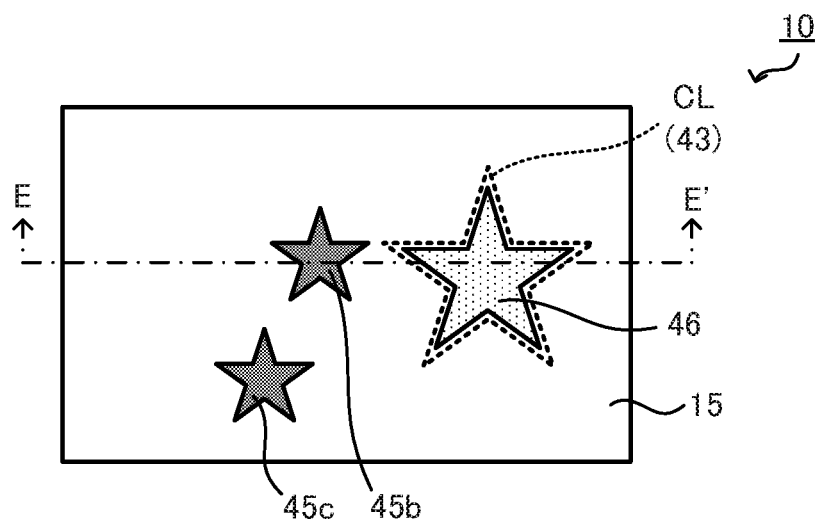

Fourthly, using a knife or the like, the user inserts the notch 43 into the second ink receiving layer 15 and the film 14 along the cutting line CL so as to make it possible to, after peeling off the film 14, leave only the region where the second color ink layer 46 is formed, and the region near the periphery of the second color ink layer 42, of the film 14 (step S24). As a result, the notch 43 is formed in the second ink receiving layer 15 and the film 14, as illustrated in FIG. 9D. FIG. 11B is a plan view illustrating a state in which the second color ink layer 42 has been printed and the position of the notch 43, and a cross-sectional view taken along line E-E' illustrated in FIG. 11B corresponds to FIG. 9D. Note that, in FIG. 9D, both ends of the cross-sectional view taken along line E-E' are omitted. As illustrated in FIG. 9D, at the completion of step S24, the film 14 is provided on the entire front surface of the thermally expandable sheet 10, and the second color ink layer 46 is present on the front surface of the thermally expandable sheet 10.

Figure 10E:
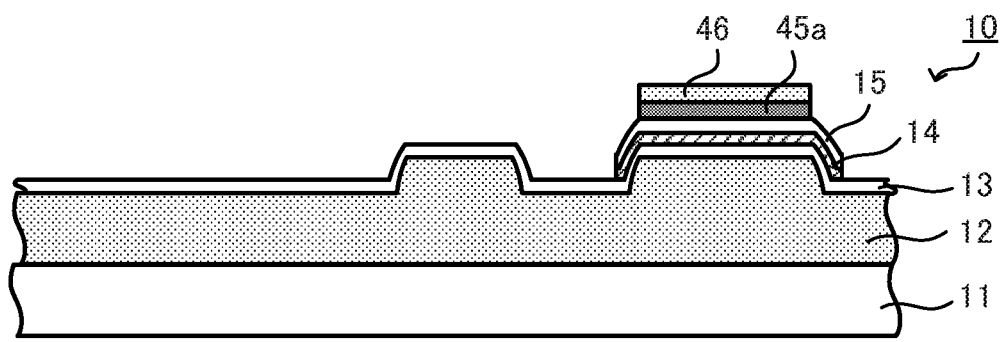
FIGS. 10E to 10H are cross-sectional views schematically illustrating the 2.5D image forming method according to Embodiment 2.
Figure 11C:
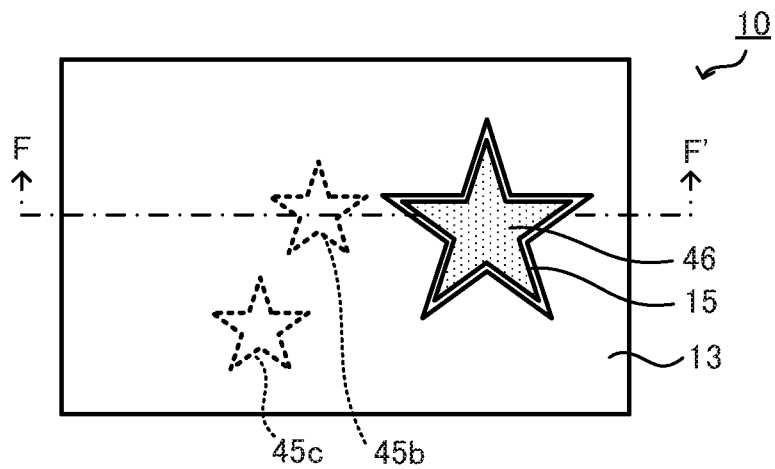

Fifthly, the user removes by peeling off the film 14 while leaving the region where the second color ink layer 46 is formed (step S25). As a result, the first ink receiving layer 13 is exposed, with the exception of the region where the second color ink layer 46 is formed, as illustrated in FIG. 10E. Note that the front side heat conversion layers 45b and 45c are removed together when the film 14 is peeled. FIG. 11C is a plan view illustrating a state after the film 14 has been removed, and a cross-sectional view taken along line F-F' illustrated in FIG. 11C corresponds to FIG. 10E. Note that, in FIG. 10E, both ends of the cross-sectional view taken along line F-F' are omitted. As illustrated in FIG. 10E and FIG. 11C, the thermally expansive layer 12 below the regions where the front side heat conversion layers 45b and 45c are provided is distended. Particularly, in FIG. 11C, the regions where the front side heat conversion layers 45b and 45c are provided are indicated by the dashed lines.

Figure 10F:
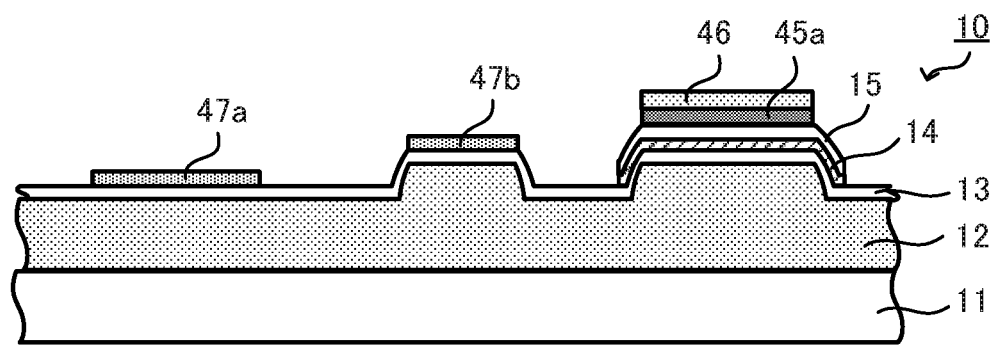
Figure 11D:
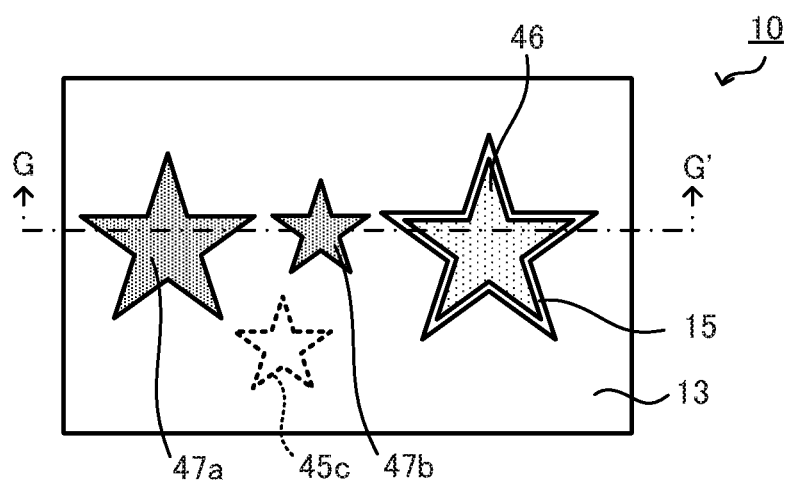

Sixthly, the user inserts the thermally expandable sheet 10, from which a portion of the film 14 has been removed, into the printing unit 52 with the front side facing upward. The printing unit 52 prints first color ink layers 47a and 47b on the front surface (on the first ink receiving layer 13) of the inserted thermally expandable sheet 10 (step S26). Specifically, the printing unit 52 discharges the various cyan (C), magenta (M), and yellow (Y) inks onto the front surface of the thermally expandable sheet 10 in accordance with the designated first color image data. As a result, the first color ink layers 47a and 47b are formed on the first ink receiving layer 13, as illustrated in FIG. 10F. FIG. 11D is a plan view illustrating a state in which the first color ink layers 47a and 47b have been printed, and a cross-sectional view taken along line G-G' illustrated in FIG. 11D corresponds to FIG. 10F. Note that, in FIG. 10F, both ends of the cross-sectional view taken along line G-G' are omitted. As illustrated in FIG. 10F, at the completion of step S26, the film 14 is present only below the second color ink layer 46 and, as illustrated in the drawing, the first color ink layers 47a and 47b are formed on the first ink receiving layer 13. Note that the first color ink layer 47b is formed in the distended region where the front side heat conversion layer 45b was used. In this case, especially when the thermally expansive layer 12 is white, problems are encountered due to the heat conversion layers, formed using carbon black-containing black ink, becoming more prominent, or the color ink layer becoming dull in color due to the black ink. However, in the present disclosure, the front side heat conversion layers 45b can be simultaneously removed when the film 14 is peeled. As a result, a superior effect is obtained in that the ink used as the front side heat conversion layer 45b can be prevented from affecting the color of the first color ink layer 47b.

Figure 10G:
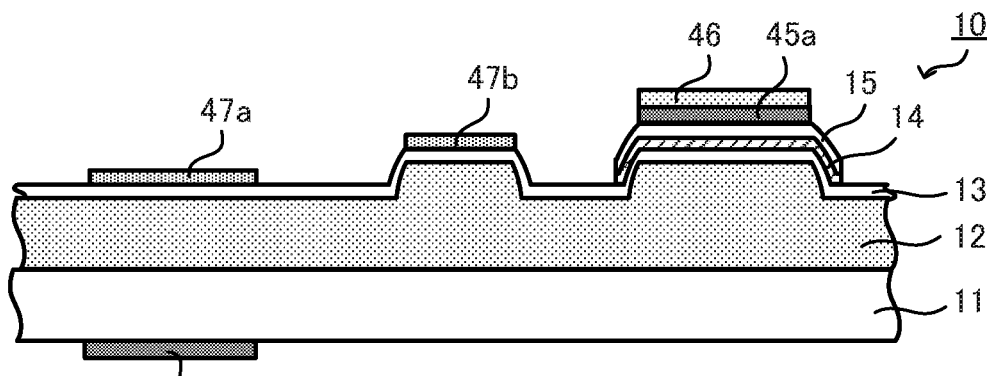

Seventhly, the user inserts the thermally expandable sheet 10, onto which the first color ink layers 47a and 47b and the second color ink layer 46 have been printed, into the printing unit 52 with the back side facing upward. The printing unit 52 prints a heat conversion layer (the back side heat conversion layer 48) on the surface side of the inserted thermally expandable sheet 10 (step S27). The printing unit 52 discharges the black ink containing carbon black onto the back surface of the thermally expandable sheet 10 in accordance with the designated back side foaming data. As a result, the back side heat conversion layer 48 is formed on the back surface of the base 11, as illustrated in FIG. 10G. In FIG. 10G, since the thermally expansive layer 12 is distended in the region where the first color ink layer 47a is formed, the back side heat conversion layer 48 is formed on the back surface of the base 11 in a region opposing at least a portion of the first color ink layer 47a across the base 11 and the thermally expansive layer 12.

Figure 10H:
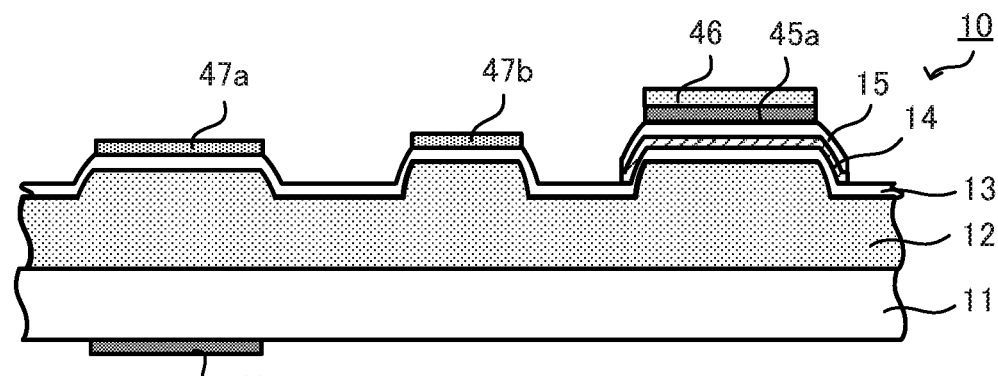

Eighthly, the user inserts the thermally expandable sheet 10, onto which the back side heat conversion layer 48 has been printed, into the expansion unit 53 with the back side facing upward. The expansion unit 53 irradiates electromagnetic waves and heats the inserted thermally expandable sheet 10 from the back side (step S28). Specifically, the irradiator (not illustrated in the drawings) of the expansion unit 53 irradiates the back side of the thermally expandable sheet 10 with electromagnetic waves. The back side heat conversion layer 48 printed on the back surface of the thermally expandable sheet 10 absorbs the irradiated electromagnetic waves, thereby generating heat. As a result, as illustrated in FIG. 10H, the region of the thermally expandable sheet 10 where the back side heat conversion layer 48 was printed rises and distends.

A 2.5D image is formed on the thermally expandable sheet 10 as a result of carrying out the procedures described above.

In this embodiment, as in Embodiment 1, materials providing different textures are used for the second ink receiving layer 15 provided on the top surface of the film 14 and the first ink receiving layer 13 provided on the bottom surface of the film 14, and at least a portion of the film 14 is peeled off. As a result, 2.5D images having varying textures can be formed on one thermally expandable sheet 10. Moreover, in this embodiment, the front side heat conversion layers 45a to 45c are formed on the second ink receiving layer 15, which is provided on the film 14, thereby making it possible to cause the front side of the thermally expandable sheet 10 to foam and distend. Sharp shapes are easier to recreate when foaming and distending using the front side heat conversion layers 45a to 45c than when using the back side heat conversion layer 48. Particularly, by forming the front side heat conversion layers 45b and 45c in the region of the film 14 that is to be peeled off, it is possible to not leave the front side heat conversion layers 45b and 45c after foaming and distending from the front side of the sheet. Moreover, influences such as turbidity arising from the ink used to form the heat conversion layers can be prevented, and the first color ink layer 47b can be provided with a desired color particularly a vivid color. Note that a configuration is possible in which color ink layers are not formed, similar to the region in which the front side heat conversion layer 45c is formed.

In the embodiments described above, the back side heat conversion layer 48 is printed at a position of the back surface of the thermally expandable sheet 10 corresponding to the first color ink layer 47a, but a configuration is possible in which a heat conversion layer is formed on the first ink receiving layer 13 and caused to distend prior to forming the first color ink layer 47a. In such a configuration, as with the foaming and distending using the front side heat conversion layers 45a to 45c, sharper shapes than when using the back side heat conversion layer 48 can be recreated, and a matte texture can be obtained.

This application is not limited to the embodiments descried above and various modifications and uses are possible. Moreover, the above-described embodiments can be combined.

For example, in the embodiments described above, an example of a configuration was described in which the film was peeled from the regions other than where the second color ink layers 42 and 46 were formed and the first ink receiving layer 13 was exposed to express regions having different textures within one thermally expandable sheet 10. This application is not limited thereto, and configurations are possible in which the thermally expandable sheet 10 is used without peeling the film 14 off, or all of the film 14 is peeled off to form a 2.5D image. When using without peeling the film 14 off, in terms of the flowchart of Embodiment 1, the forming processing is carried out with steps S2 to S4 omitted. Moreover, when peeling off all of the film 14 and using, the forming processing is carried out with steps S1 to S2 omitted. Additionally, in terms of the flowchart of Embodiment 2, steps S24 and S25 are omitted, for example. By configuring in this manner, it is possible to form different textures, for example, a 2.5D image providing a glossy texture throughout or a 2.5D image providing a matte texture throughout, throughout one thermally expandable sheet 10. Moreover, a benefit is obtained in that the need to individually prepare thermally expandable sheets providing different textures is eliminated.

In the embodiments described above, the front side foaming data and the back side foaming data can be appropriately modified in accordance with the shape of the 2.5D image to be formed. The amount of heat during the electromagnetic wave irradiation varies depending on whether the electromagnetic wave heat conversion layer was provided or the printing density (ink density) of the electromagnetic wave heat conversion layer. As such, when determining at least one or more of the front side foaming data or the back side foaming data, the ink gradation (printing density) of the electromagnetic wave heat conversion layer and/or the region where the electromagnetic wave heat conversion layer is formed are determined for at least two regions to ensure that the distended shape of the thermally expansive layer 12 is the desired shape of the 2.5D image Specifically, the foaming data is determined by: i) forming the electromagnetic wave heat conversion layer in one region and not forming the electromagnetic wave heat conversion layer in another region, ii) increasing the ink density (printing density) in one region and reducing the ink density in another region, or iii) a combination thereof. Additionally, the determination of i) to iii) is not limited to cases where determining for two predetermined regions, and it is possible to determine for three of more regions.

Additionally, in Embodiment 1 described above, a configuration is described in which the film 14 is removed after printing of the second color ink layer 42. However, the present disclosure is not limited to this example. The peeling off step may also be performed beforehand. In such a case, step S1 is performed after performing steps S2 and S3 indicated in FIG. 5. Also, in the case in which the peeling off steps (steps S2 and S3) are performed beforehand, the region where the color image is printed in step S4 is exposed on the first ink receiving layer prior to step S1. Therefore, the step (step S1) in which the color image is printed on the second ink receiving layer and the step (step S4) in which the color image is printed on the first ink receiving layer may be performed separately or may be performed at the same time. When the step S1 and the step S4 are performed at the same time, the color image printing step is preferably performed one time. In such a case, the step (step S2) in which the film is cut may be performed before the peeling-off step (step S3), and the notch 43 can be inserted when the thermally expandable sheet 10 is produced.

Likewise, in Embodiment 2, the step S24 and the step S25 may performed prior to the step (step S23 indicated in FIG. 8) in which the color image is printed on the second ink receiving layer. In such a case, the step (step S23) in which the color image is printed on the second ink receiving layer and the step (step S26) in which the color image is printed on the first ink receiving layer may be performed separately or may be performed at the same time. When the step S23 and the step S26 are performed at the same time, the color image printing step is preferably performed one time. In such a case, the step (step S24) in which the film is cut may be performed before the peeling-off step (step S25), and the notch 43 can be inserted when the thermally expandable sheet 10 is produced.

Also, the positions where the front side heat conversion layer, the back side heat conversion layer, and the color ink layer are formed are not limited to the examples given in the forgoing embodiments. Any position is acceptable. In order to produce a desired shaped object, the front side heat conversion layer, the back side heat conversion layer, and the color ink layer may be used in any manner. For example, in Embodiment 2 four different star-types of shaped objects formed on a combination of the front side heat conversion layer, the back side heat conversion layer, and the color ink layer is described. However, the present disclosure is not limited to this example. It is unnecessary for these combinations to be used at the same time. It is sufficient as long at least one combination is used. Also, the combination of the front side heat conversion layer, the back side heat conversion layer, and the color ink layer may be changed as necessary. For example, a back side heat conversion layer may be formed instead of the front side heat conversion layer 45a. In such a case, the color ink layer 46 can be provided on the second ink receiving layer 15. Further, the back side heat conversion layer may be formed opposing at least a portion of the front side heat conversion layer 45a, and the front side heat conversion layer 45a and the back side heat conversion layer may be used to cause the thermally expansive layer 12 to distend. Regarding the regions formed by the color ink layers 47a and 47b, the front side heat conversion layer and the back side heat conversion layer may be used to cause the thermally expansive layer 12 to distend.

Figure 5:
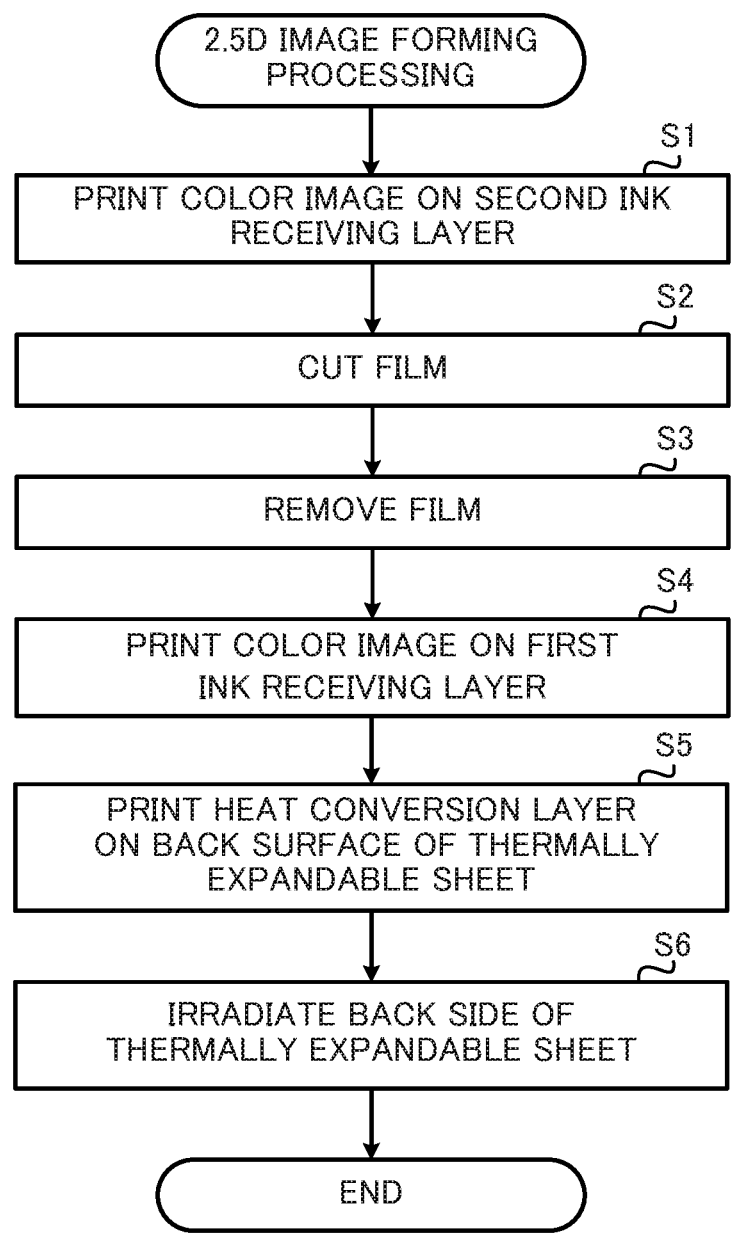
FIG. 5 is a flowchart illustrating the 2.5D image forming process according to Embodiment 1.

Also, in the flowchart illustrated in FIG. 5, although the heat conversion layer is formed in step S5, and then, in step S6, the thermally expansive layer is irradiated with electromagnetic waves, step S6 does not need to be performed immediately after step S5, that is, step S6 can be performed after a passage of time. For example, at the very least, the thermally expansive layer formed in step S5 that is illustrated in FIG. 5 may be distributed and then step S6 can be performed by the user. In such a case, the heat conversion layer is formed on either the back surface of the base 11 or the second ink receiving layer 15. In such a case, the peeling off of the film 14 may be performed by the user. Alternatively, a portion of the film 14 is peeled off and the heat conversion layer may be formed on at least one of the first ink receiving layer 13, the back surface of the base 11, or the second ink receiving layer 15. Furthermore, in addition to step S6, the user may also perform the step (step S4) in which the color ink layer is formed. The same applies to Embodiment 2.

The terms "front", "back", "top", and "bottom" in the aforementioned embodiments are used in order to simplify the description, and are not intended limit the manner in which the thermally expandable sheet 10 is used. Therefore, the back side of the thermally expandable sheet 10 may also be used as the front.

The materials of the various layers of the thermally expandable sheet 10 described in the embodiments are merely examples and should not be construed as limiting or excluding the use of materials other than those described in the embodiments. Moreover, the thicknesses of the various layers of the thermally expandable sheet 10 are exaggerated for the sake of depiction and are not limited to the proportions illustrated in the drawings.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A 2.5D image forming method, comprising:
    using a thermally expandable sheet comprising a thermally expansive layer formed on one surface of a base, a first ink receiving layer that is formed on the thermally expansive layer for receiving ink, a film provided on the first ink receiving layer, and a second ink receiving layer that is formed on the film for receiving ink, the first ink receiving layer being formed of a material that provides a texture different from a texture of the second ink receiving layer;
    forming of a second image on the second ink receiving layer;
    removing at least a portion of the film and exposing the first ink receiving layer;
    forming of a first image on the first ink receiving layer that is exposed;
    forming of a first electromagnetic wave heat conversion layer for converting electromagnetic waves to heat on another surface of the base; and
    irradiating of the first electromagnetic wave heat conversion layer with electromagnetic waves thereby causing at least a portion of the thermally expansive layer to distend, wherein
        the film is removed such that a region where the second image is printed or to be printed remains.

2. The 2.5D image forming method according to claim 1, further comprising:
    forming of a second electromagnetic wave heat conversion layer on the second ink receiving layer, prior to the forming of the second image; and
    irradiating of the second electromagnetic wave heat conversion layer with electromagnetic waves thereby causing at least a portion of the thermally expansive layer to distend.

3. The 2.5D image forming method according to claim 1, wherein the first electromagnetic wave heat conversion layer is formed at a position on the another surface of the base corresponding to the first image.

4. The 2.5D image forming method according to claim 1, further comprising:
    forming of a second electromagnetic wave heat conversion layer for converting electromagnetic waves to heat on the second ink receiving layer;
    irradiating of the second electromagnetic wave heat conversion layer with electromagnetic waves thereby causing at least a portion of the thermally expansive layer to distend;
    removing the second ink receiving layer and the film and exposing the first ink receiving layer after a region where the second electromagnetic wave heat conversion layer has distended; and
    forming of the first image on the first ink receiving layer that is exposed.

5. The 2.5D image forming method according to claim 1, further comprising:
    forming of a third electromagnetic wave heat conversion layer for converting electromagnetic waves to heat on the another surface of the base; and
    irradiating of the third electromagnetic wave heat conversion layer with electromagnetic waves thereby causing at least a portion of the thermally expansive layer to distend.

6. The 2.5 image forming method according to claim 1, wherein the forming of the first image and the forming of the second image are performed at the same time after the removing of the film.

* * * * *

UNITED STATES PATENT AND TRADEMARK OFFICE
CERTIFICATE OF CORRECTION

PATENT NO. : 10,994,454 B2  
APPLICATION NO. : 16/018342  
DATED : May 4, 2021  
INVENTOR(S) : Motoyanagi et al.

Page 1 of 1

It is certified that error appears in the above-identified patent and that said Letters Patent is hereby corrected as shown below:

In the Claims

Column 18, Claim 6, Line 46 should read:
6. The 2.5D image forming method according to claim 1, Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*